3,324,094
PROCESS FOR THE MANUFACTURE OF POLY-
MERS AND COPOLYMERS OF ISOBUTYLENE
Sanae Tanaka, Akiya Nakamura, and Etsuro Kubo, all of
Tokyo, Japan, assignors to Mitsubishi Petrochemical
Company Limited, Tokyo, Japan, a corporation of
Japan
No Drawing. Filed Nov. 6, 1963, Ser. No. 321,667
Claims priority, application Japan, Nov. 18, 1962,
37/48,845
9 Claims. (Cl. 260—88.2)

The present invention relates to a process for the manu-
polyhydroxy compounds.
facture of polymers and copolymers of isobutylene.

The so-called "cationic catalyst" has hithertobefore been used in a polymerization or copolymerization of isobutylene. In this case, however, a higher polymer or copolymer can be obtained only at a low temperature. In the polymerization or copolymerization of isobutylene at about a room temperature, it is difficult to obtain a solid high polymer or copolymer of isobutylene when the above-mentioned catalyst is used, and only a small amount of liquid polymer or copolymer having a low molecular weight can be formed. In order to obtain a high polymer or copolymer of isobutylene by a cationic polymerization or a copolymerization, therefore, it is necessary to carry out the polymerization at a low temperature between about $-70°$ and about $-100°$ C. This is a considerable obstruction to its industrial practice.

On the other hand, it has been known that in the polymerization or copolymerization of olefins at about a room temperature in the presence of coordinate catalyst called as "Ziegler-Natta type catalysts," a polymer or copolymer having a high molecular weight can be manufactured in the case of ethylene or monoolefin having a structural formula as "$CH_2=CHR$," but, in general, the olefin ($CH_2=CR_1R_2$) having a vinylidene type double bond is difficult to be polymerized with anionic or anionic coordinated mechanism and thus in the case of isobutylene a polymer having only a low molecular weight may be formed. It has been considered that this is based upon the fact that the polymerization with Ziegler-Natta type catalyst is limited by an electrical property of two methyl groups of isobutylene and also a steric factor of vinylidene structure of double bond. However, it is desirable that a solid high polymer of isobutylene be obtained under such a mild condition.

We have now found that a solid product having a high molecular weight can be manufactured in good yield by polymerizing or copolymerizing isobutylene at about a room temperature under a normal pressure or a little increased pressure, when a certain combination of Ziegler-Natta type catalyst is used.

According to the present invention, therefore, we provide a process for the manufacture of a solid polymer or copolymer of isobutylene wherein isobutylene or isobutylene and ethylene or $\alpha$-olefin such as butene-1, propylene, etc., or butene-2 is polymerized or copolymerized in an inert solvent at a temperature between $-20°$ and $50°$ C., preferably between $0°$ and $20°$ C. under a normal pressure of an increased pressure by using catalysts which are obtained by reacting organic aluminium compounds represented by the general formula: $AlR_nX_{3-n}$ wherein R stands for alkyl, allyl and aralkyl radicals, X stands for halogen and hydrogen atoms and alkoxyl, amino and nitrile radicals and $n$ is an integral of 1, 2 and 3, with oxyhalides of transition metal of groups 4A to 6A of Periodic Table. The preferable catalysts of the present invention are those which are formed by the combination of vanadyl chloride and $AlR_nX_{3-n}$ wherein R stands for alkyl radical, X stands for halogen atom and $n$ is 1 to 3 or those which are formed by the combination of chromyl chloride and $AlR_2X$ wherein R stands for alkyl radical and X stands for halogen atom and those which are formed by the combination of stannic chloride and $AlEt_2X$ or $AlEtX_2$ wherein Et stands for ethyl radical and X stands for halogen atom. The solid polymer cannot be obtained with normal combination of catalyst, for example $AlEt_3-TiCl_4$ or $AlEt_2Cl-TiCl_3$ wherein Et stands for ethyl radical in the same condition mentioned above.

The present invention is illustrated by the following examples and is not limited thereto.

*Example 1*

250 ml. of anhydrous n-heptane, 1.92 g. of diethyl aluminium monochloride and 4.5 g. of vanadyl chloride were charged into a glass reactor having 1 litre capacity under a nitrogen atmosphere. Isobutylene was introduced into the reactor with a flowing velocity of 1 l./min. under a normal pressure with a vigorous agitation for one hour, the temperature was raised as the polymerization was proceeded and therefore the temperature was maintained at a temperature of $0°$ to $10°$ C. by using an ice bath. The viscosity of content in the reactor was gradually increased as the reaction time was increased and thus the efficient agitation became difficult gradually. The polymerization was stopped by adding lower alcohol, for example methyl alcohol, ethyl alcohol, etc., into the reactor. The remained catalyst was decomposed and removed by adding a small amount of hydrochloric acid into the reaction mixture. The reaction solution was poured into a large amount of methanol to precipitate a large amount of white rubber-like polymer. The polymer was dried under a reduced pressure to obtain 27 g. of white rubber-like solid.

*Example 2*

Example 1 was repeated except that as the catalyst 2.88 g. of diethyl aluminium monochloride and 3.64 g. of chromyl chloride were used. When isobutylene was polymerized for one hour as described in Example 1, 23 g. of solid polymer was obtained.

*Example 3*

Example 1 was repeated except that as the catalyst 5.75 g. of diethyl aluminium monochloride and 4.46 g. of stannic chloride were used. When isobutylene was polymerized for one hour as described in Example 1, 20 g. of solid polymer was obtained.

In this example, when titanium trichloride, titanium tetrachloride or vanadium tetrachloride was used as the catalyst in place of stannic chloride, only liquid polymers were formed.

*Example 4*

Example 1 was repeated except that as the catalyst 3.94 g. of triethyl aluminium and 3.27 g. of vanadyl chloride were used. 31 g. of white rubber-like polymer was obtained.

*Example 5*

Example 1 was repeated except that as the catalyst 3.94 g. of triethyl aluminium and 3.65 g. of vanadyl chloride were used and a mixed gas containing 55% by volume of propylene and 45% by volume of isobutylene were introduced into a reactor for one hour. 34 g. of propylene-isobutylene copolymer was obtained.

What we claim is:
1. A process for the manufacture of a solid polymerized product from isobutylene comprising reacting isobutylene in an inert solvent at a temperature between $-20°$ and $50°$ C. by using catalysts obtained by reacting organic aluminium compounds having the formula

$AlR_nX_{3-n}$, wherein R is selected from the group consisting of alkyl, allyl and aralkyl radicals, X is selected from the group consisting of halogen, hydrogen, alkoxyl, amino and nitrile radicals and $n$ is an integral of 1 to 3, with oxyhalides of transition metals of groups 4A to 6A of the Periodic Table.

2. A process according to claim 1, wherein the organic aluminium compound is $AlEt_3$ and the oxyhalide of transition metal is $VOCl_3$.

3. A process according to claim 1, wherein the organic aluminium compound is $AlEt_2Cl$ and the oxyhalide of transition metal is $VOCl_3$.

4. A process according to claim 1, wherein the organic aluminium compound is $AlEt_2Cl$ and the oxyhalide of transition metal is $CrO_2Cl_2$.

5. A process according to claim 1, wherein the organic aluminium compound is $AlEtCl_2$ and the oxyhalide of transition metal is $VOCl_3$.

6. A process according to claim 9, wherein the α-olefin is propylene.

7. A process according to claim 9, wherein the α-olefin is butene-1.

8. A process according to claim 9, wherein the monomer is butene-2.

9. The process of claim 1, wherein said isobutylene is copolymerized with a monomer selected from the group consisting of butene-2 and an alpha olefin.

References Cited

UNITED STATES PATENTS 3,066,123  11/1962  Strohmayer _____ 260—93.1

FOREIGN PATENTS 573,623  4/1959  Canada.
543,259  5/1956  Belgium.

JOSEPH L. SCHOFER, *Primary Examiner.*

JAMES A. SEIDLECK, F. L. DENSON,
*Assistant Examiners.*